United States Patent [19]

Sato et al.

[11] Patent Number: 5,248,885
[45] Date of Patent: Sep. 28, 1993

[54] RADIATION DETECTOR HAVING MEANS FOR EXCITING TRAPPED CARRIERS

[75] Inventors: Kenji Sato, Otsu; Toshiyuki Sato, Kyoto, both of Japan

[73] Assignee: Shimadzu Corporation, Kyoto, Japan

[21] Appl. No.: 751,888

[22] Filed: Aug. 29, 1991

[30] Foreign Application Priority Data

Aug. 30, 1990 [JP] Japan ............................ 2-229867
Sep. 26, 1990 [JP] Japan ............................ 2-258573

[51] Int. Cl.$^5$ .......................................... G01T 1/24
[52] U.S. Cl. ............................ 250/370.15; 250/370.09; 250/370.12; 250/370.13
[58] Field of Search ............... 250/370.15, 370.07, 250/370.12, 370.13, 370.09, 327.2 L

[56] References Cited

U.S. PATENT DOCUMENTS 3,636,354  1/1972  Leheny et al. ............... 250/370.12
4,547,670 10/1985  Sugimoto et al. ............ 250/370.13

Primary Examiner—Carolyn E. Fields
Attorney, Agent, or Firm—Armstrong, Westerman, Hattori, McLeland & Naughton

[57] ABSTRACT

In a radiation detector for detecting a high dose radiation, a radiation detecting element is heated or infrared rays are emitted into the radiation detecting element. Carriers trapped by defects or the like in the radiation detecting element are thereby excited to compensate for output reductions occurring at a time of high dose incidence. Where infrared rays are used, the energy of the infrared rays is set smaller than a band gap energy of a compound semiconductor forming the radiation detecting element and greater than a trap level present in the compound semiconductor.

6 Claims, 4 Drawing Sheets

Fig. 8
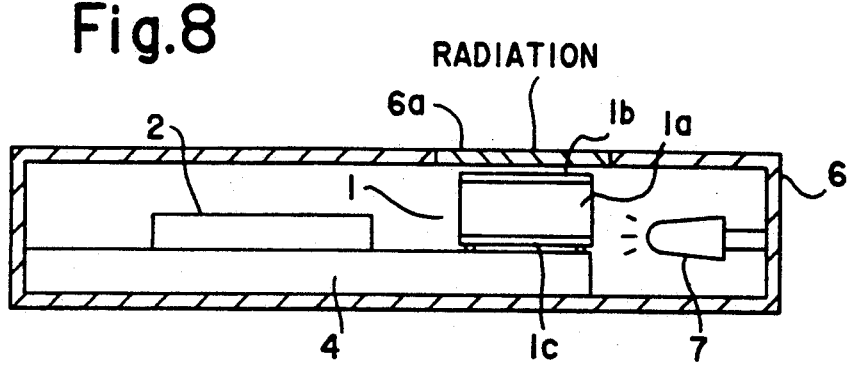
Fig. 9A
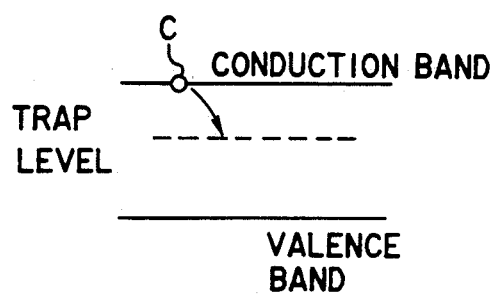
Fig. 9B
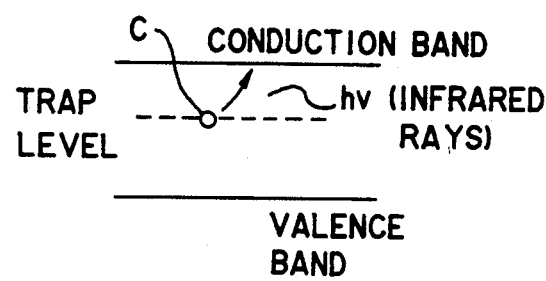
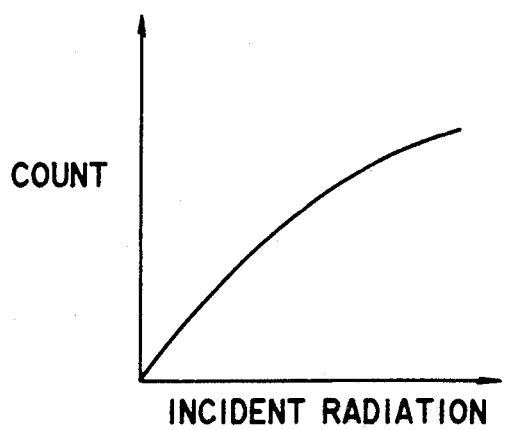
Fig. 10A
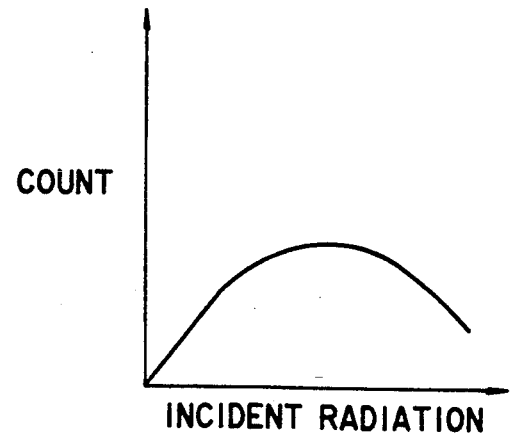
Fig. 10B

1
RADIATION DETECTOR HAVING MEANS FOR EXCITING TRAPPED CARRIERS

BACKGROUND OF THE INVENTION (1) Field of the Invention

The present invention relates to radiation detectors used in the medical, industrial, nuclear and other fields in which radiations of high dose rates are measured.

(2) Description of the Related Art

Conventionally, this type of radiation detector includes a radiation detecting element formed of a compound semiconductor having large band gaps, such as GaAs, CdTe and $HgI_2$. The radiation detecting element used in obtaining radiographic images, generally, includes a plurality of signal fetching electrodes formed on one surface of a compound semiconductor substrate and corresponding to respective pixels, and a common bias electrode formed on the other surface thereof.

When a reverse bias is applied to the bias electrode of such a radiation detecting element, and photons of a radiation such as X-rays impinge on the semiconductor, carriers (electrons and holes) corresponding in energy to the incident photons are formed in the semiconductor. Charge pulses are generated as a result of movement of these electrons and holes to the respective electrodes. The number of these charge pulses is counted for each pixel to obtain a radiographic image which is a count distribution image of the incident photons of the radiation.

With the compound semiconductor noted above, it is difficult to promote growth of high-resistance crystals for use as a radiation detecting element. Only crystals having numerous defects are available today.

These defects act as centers for trapping the carriers formed in the radiation detecting element by incident photons of a radiation. The defects having long time $\tau_D$ for which carriers remain trapped, reduce effective carrier mobility $\mu_r$ as expressed by equation (1) below, or act as scattering centers within the semiconductor crystals. This causes a reduction of output at a time of high dose radiation, as indicated by a curve (a) in FIG. 1.

$$\mu_r = \frac{\mu_0 \cdot \tau^+}{(\tau^+ + \tau_D)} \quad (1)$$

In the above equation, $\mu_0$ is the intrinsic mobility of carriers, and $\tau^+$ is a time taken before free carriers are trapped (i.e. trapping time).

In FIG. 1, reference (b) denotes a logic line disregarding double counting, and reference (c) a characteristic curve of pixels free from the output reduction noted above.

When output reductions take place as noted above, there will be two incident amounts of radiation for a certain count. This is detrimental to a correct detection of the incident amount of radiation. Further, the defects noted hereinbefore are distributed locally in the semiconductor crystals. Consequently, in the case of an array type radiation detecting apparatus for use in radiography, variations in detection sensitivity occur among the pixels, which produce an image having an irreparable irregularity.

SUMMARY OF THE INVENTION

The present invention has been made with a view to eliminating the disadvantage of the prior art noted above. The object of the present invention, therefore, is to provide an improved radiation detector free from output reductions at a time of high dose incidence despite the use of a compound semiconductor having numerous defects.

The above object is fulfilled, according to the present invention, by a radiation detector for detecting radiation, comprising a radiation detecting element formed of a compound semiconductor, and a heater for heating the radiation detecting element.

The radiation detecting element has a bias electrode on one surface of a compound semiconductor and one or more signal fetching electrodes formed on the other surface thereof. The radiation detecting element having a plurality of signal fetching electrodes may be a one-dimensional array type radiation detecting element with the signal fetching electrodes arranged in a row, or a two-dimensional array type radiation detecting element with the signal fetching electrodes arranged in two-dimensional directions. The one-dimensional and two dimensional array type radiation detecting elements are used mainly in radiography.

The heater for heating the radiation detecting element is not limited to any particular type, and may employ resistance heating, infrared heating or electromagnetic induction heating. Where the radiation detecting element includes a plurality of signal fetching electrodes, i.e. a plurality of pixels, each pixel need not be heated independently of the other. The radiation detecting element may be divided into a plurality of blocks to be heated independently of one another. Alternatively, the entire radiation detecting element may be heated by a single heater. In either case, the heater should desirably be controlled to provide a temperature suited to compensate for the output reductions occurring when a high dose radiation impinges on the radiation detecting element.

The present invention has functions as set out below.

A ratio $N/N_T$ between concentration N of free carriers not trapped in the compound semiconductor and concentration $N_T$ of trapped carriers is expressed by the following equation (2) based on the principle of detailed balance:

$$\frac{N}{N_T} = \frac{\tau^+}{\tau_D} \quad (2)$$

Further, the ratio $N/N_T$ is expressed also by the following equation (3) based on the semiconductor band theory:

$$\frac{N}{N_T} = \frac{N_C}{N_D} \cdot \text{EXP}\left(\frac{-E_D}{kT}\right) \quad (3)$$

In the above equation (3), $N_C$ is a state density of the compound semiconductor, $N_D$ is a state density of the trap level, $E_D$ is a potential energy of the trap level, k is Boltzmann's constant, and T is an absolute temperature.

From the equations (2) and (3), time $\tau_D$ for which carriers remain trapped is expressed by the following equation (4):

$$\tau_D = \frac{N_D}{N_C} \cdot \tau^+ \cdot \mathrm{EXP}\left(\frac{E_D}{kT}\right) \tag{4}$$

It has been confirmed empirically that, compared with $\tau_D$, trapping time $\tau^+$ hardly changes at or around room temperature. Thus, it is seen from the equation (4) that $\tau_D$ is variable with an exponential function of inverse of temperature T. That is, the time $\tau_D$ of trapped state decreases rapidly with an increase in temperature T, thereby increasing the effective mobility $\mu_r$ of the carriers (see equation (1) set out hereinbefore). Consequently, the carriers trapped by the defects in the compound semiconductor are released quickly and reach the electrodes of the radiation detecting element.

The present invention utilizes the above principle, and increases the effective carrier mobility by heating the radiation detecting element, thereby to avoid output reductions occurring at a time of high dose incidence.

In a further aspect of the present invention, a radiation detector for detecting radiation comprises a radiation detecting element formed of a compound semiconductor, and a light source for emitting into the compound semiconductor infrared rays having an energy smaller than energy of a band gap of the compound semiconductor and greater than a trap level present in the compound semiconductor.

With the energy of infrared rays set as above, the carriers trapped by the defects in the compound semiconductor are excited to return to the conduction band, and move through the semiconductor crystals to be collected by the electrodes.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 8 is a schematic view of a radiation detector in a second embodiment of the present invention, FIGS. 9A and 9B are views illustrating functions of the second embodiment, and FIGS. 10A and 10B are characteristic views showing a case of emitting infrared rays to the radiation detector, and a case of emitting no infrared rays.

DESCRIPTION OF THE PREFERRED EMBODIMENTS

Preferred embodiments of the present invention will be described in detail hereinafter with reference to the drawings.

First Embodiment

Figure 1:
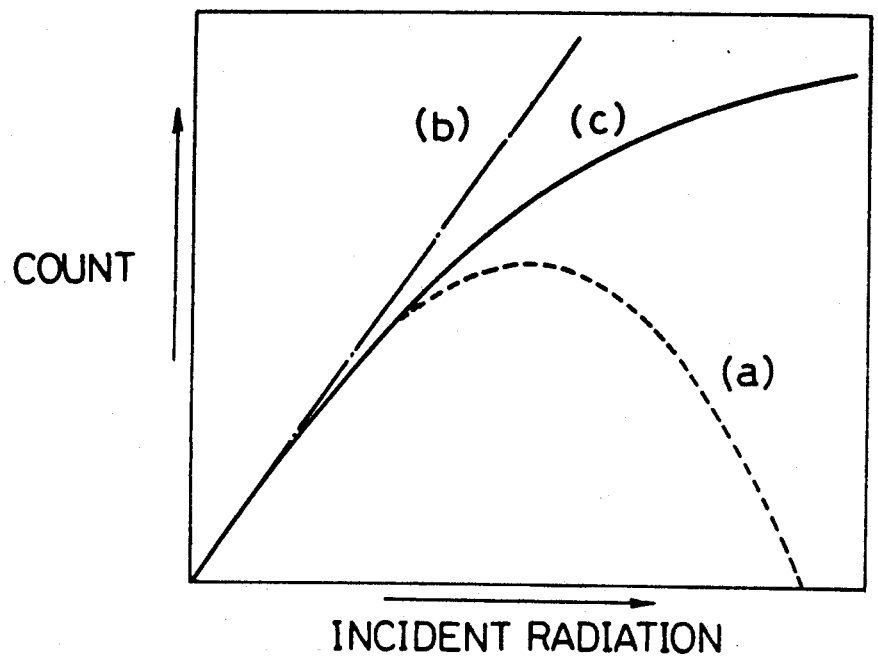
FIG. 1 is a characteristic view illustrating a disadvantage of the prior art.
Figure 2:
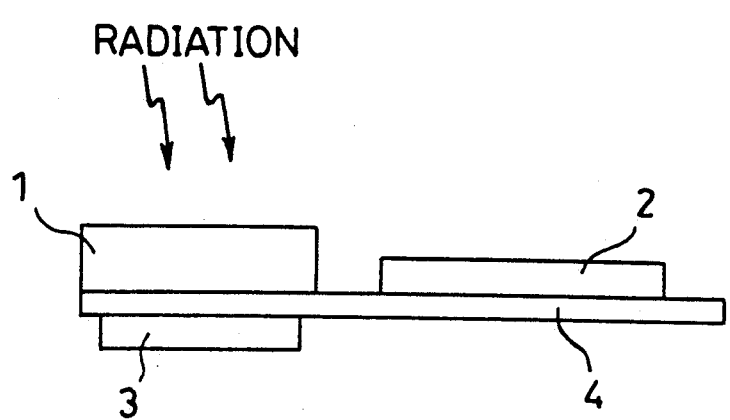
FIG. 2 is a schematic view of a radiation detector in a first embodiment of the present invention.

FIG. 2 is a schematic side view of a radiation detector embodying the present invention. In FIG. 2, reference 1 denotes a radiation detecting element, reference 2 a signal processing circuit, reference 3 a heater, and reference 4 a printed board. The radiation detecting element 1 is formed of a compound semiconductor such as GaAs, CdTe or HgI$_2$. A bias electrode is formed on an upper surface of the compound semiconductor, while a signal fetching electrode is formed on a lower surface thereof. The respective electrodes are electrically connected in an appropriate way to wiring formed on the printed board 4.

The signal processing circuit 2 is formed of an integrated circuit, for example, which includes a circuit for amplifying and wave-shaping charge pulses output from the signal fetching electrode of the radiation detecting element 1. Pulses output from the signal processing circuit 2 are applied to a pulse counting circuit not shown.

The heater 3 for heating the radiation detecting element 1 is a sheet-like heater of a thin nichrome wire laid in a wave form. This heater 3 is applied to a back surface of the printed board 4 opposite the radiation detecting element 1, to heat the radiation detecting element 1 through the printed board 4. A thermocouple, not shown, is interposed between the heater 3 and printed board 4. The radiation detecting element 1 is heated to a suitable temperature under control of this thermocouple, to compensate for a reduction in the output of the radiation detecting element 1 occurring with a high dose incidence. Preferably, the radiation detecting element 1 is heated to a temperature on the order of 40° to 80° C. If the temperature is too low, the carriers trapped in the compound semiconductor cannot be excited sufficiently. Conversely, an excessively high temperature could result in the inconvenience of increasing leak current.

Figure 3:
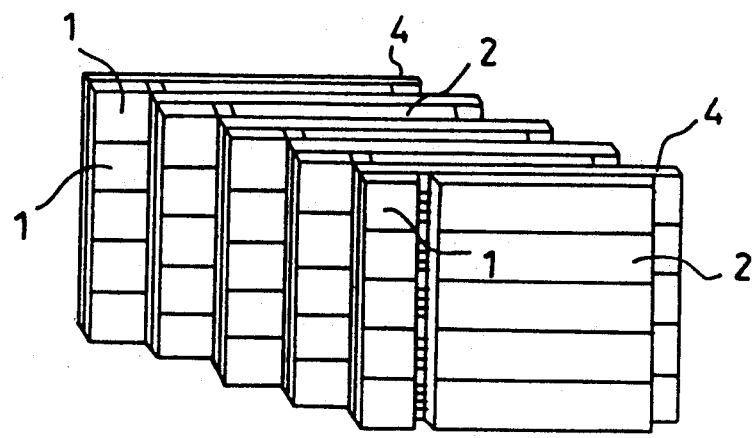
FIG. 3 is a perspective view of an array type radiation detecting apparatus formed of radiation detectors in the first embodiment.
Figure 4:
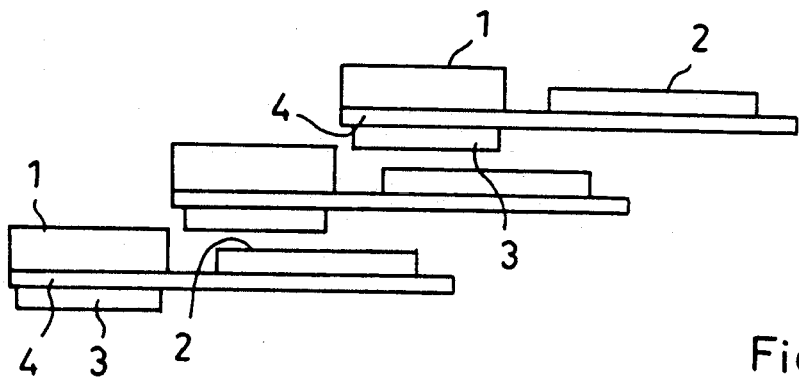
FIG. 4 is an enlarged side view of part of the array type radiation detecting apparatus shown in FIG. 3.

An array type radiation detecting apparatus formed of radiation detectors as above will be described next. Referring to FIG. 3, this array type radiation detecting apparatus includes radiation detectors as shown in FIG. 2 arranged on a plurality of planes with the radiation detecting elements 1 forming a row on each plane. Each row of the radiation detecting elements 1 is displaced from an adjacent row to form a stepped assembly as shown in FIG. 4.

Variations in sensitivity among the radiation detecting elements 1 of the array type radiation detecting apparatus are compensated for in the following way. First, the number of charge pulses output from each radiation detecting element 1 is counted while varying incident amount of radiated photons with the radiation detecting elements 1 maintained in an unheated condition (room temperature).

Figure 5:
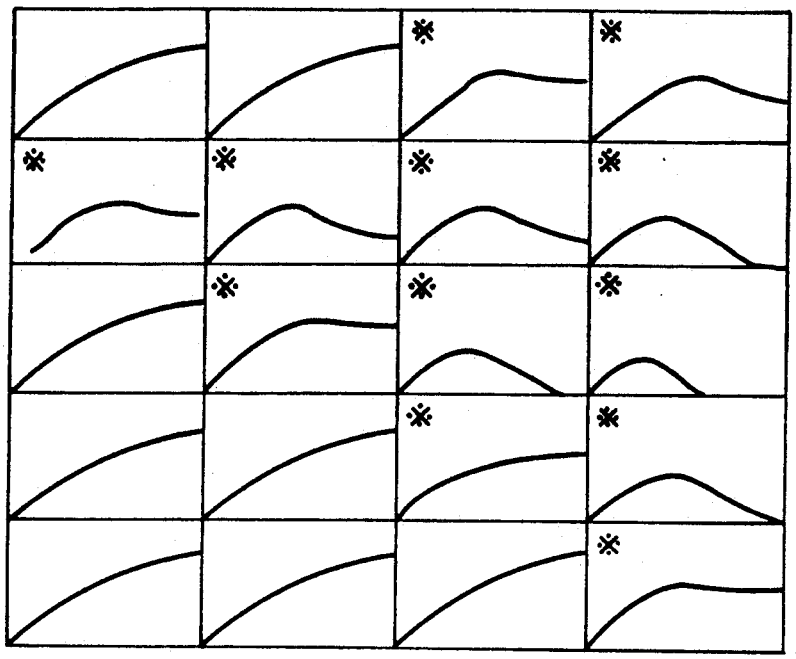
FIG. 5 is a characteristic view of pixels in the array type radiation detecting apparatus with radiation detecting elements in a room temperature condition.
Figure 6:
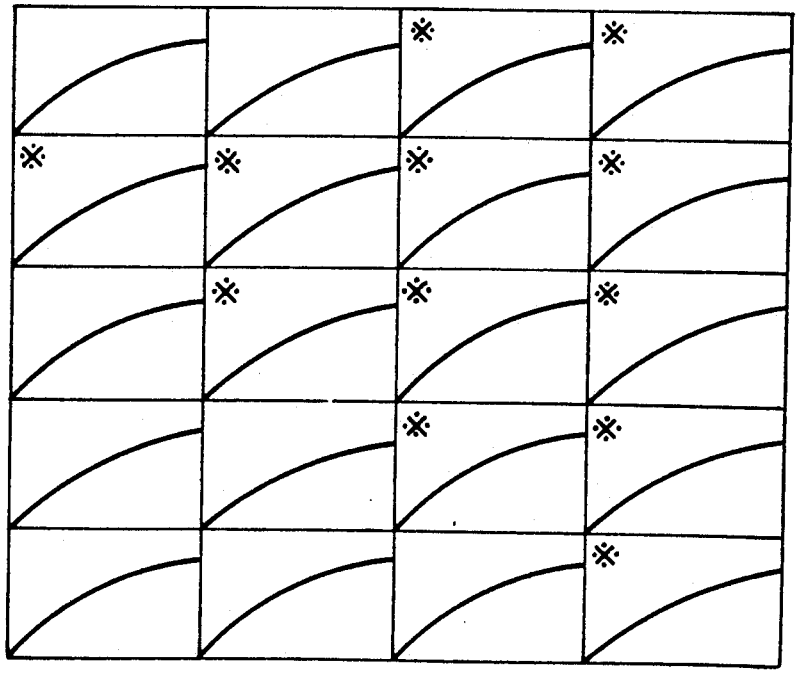
FIG. 6 is a characteristic view of the pixels in the array type radiation detecting apparatus with the radiation detecting elements in a heated condition.

FIG. 5 shows output characteristics of respective pixels corresponding to the radiation detecting elements 1 obtained from the above measurement. Output reductions have occurred in the pixels marked with an asterisk (*). The radiation detecting elements 1 providing the output reductions are appropriately heated by the associated heaters 3 to compensate for the output reductions. Consequently, as shown in FIG. 6, similar outputs are obtained for the pixels, diminishing the sensitivity variations in the array type radiation detecting apparatus.

In the foregoing embodiment, the heater 3 is opposed to the radiation detecting element 1 across the printed board 4. However, the position of the heater 3 is not limited to the above example. The heater 3 may be provided around the radiation detecting element 1 or any other location as long as the heater 3 is capable of heating the radiation detecting element 1.

Figure 7:
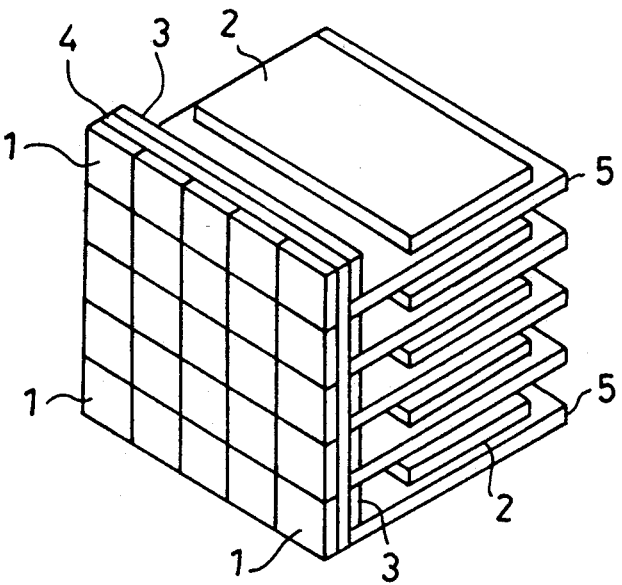
FIG. 7 is a perspective view of a modified array type radiation detecting apparatus.

FIG. 7 shows another example of array type radiation detecting apparatus. This apparatus includes one printed board 4 having a plurality of radiation detecting elements 1 arranged in two-dimensional directions on one surface thereof, and a plurality of printed boards 5 attached at right angles to a back surface of the above detecting printed board 4 and each carrying a signal processing circuit 2. This array type radiation detecting apparatus also has heaters 3 opposed to the respective radiation detecting elements 1 across the printed board 4. Thus, the sensitivity variations are diminished by compensating for output reductions of the radiation detecting elements 1.

The present invention is applicable also to a large scale radiation detecting apparatus having array type radiation detecting apparatus as shown in FIG. 7 arranged in matrix form.

In the embodiment described above, the radiation detecting element 1 includes a single signal fetching electrode to provide a single pixel. However, the present invention is not limited to this construction. The radiation detecting element 1 may be an array type radiation detecting element having a plurality of pixels arranged one-dimensionally or two-dimensionally. In this case, the heater 3 need not be provided for each pixel, but may be provided for each element or for a plurality of elements. As long as the elements are heated to an appropriate temperature range, little increase of leak current will occur for the pixels having normal output characteristics, and a compensation for output reductions may be made only for the pixels undergoing the output reductions at a time of high dose incidence.

Second Embodiment

FIG. 8 is a sectional side view showing an outline of a radiation detector in a second embodiment of the present invention.

As in the first embodiment, a radiation detecting element 1 is formed of a compound semiconductor. This element 1 is an array type radiation detecting element having a plurality of pixels arranged one-dimensionally or two-dimensionally. The radiation detecting element 1 is mounted on a printed board 4 by the flip chip method, for example. The printed board 4 also carries a signal processing circuit 2 as in the first embodiment.

The printed board 4 having the radiation detecting element 1 and signal processing circuit 2 as above is contained in a casing 6. A radiation such as of X-rays impinges on the radiation detecting element 1 through a window 6a of the casing 6. The window 6a is formed of a thin aluminum plate or the like penetrable by radiation.

This embodiment has a characterizing feature in that a light source for emitting infrared rays, e.g. an infrared laser diode 7, is disposed inside the casing 6 and adjacent one side of the radiation detecting element 1 to emit infrared rays into the radiation detecting element 1. This infrared laser diode 7 outputs an energy smaller than the band gap energy of CdTe forming the radiation detecting element 1 and greater than a trap level present in CdTe crystals, e.g. infrared rays of 0.6 to 1.5 eV. If the infrared energy is smaller than the above range, trapped carriers cannot be excited sufficiently. Conversely, if the infrared energy is greater than the above range, carriers in the valence band are excited at an increased rate by the conduction band, thereby causing the inconvenience of increased leak current. The infrared rays emitted from the infrared laser diode 7 proceed into the CdTe substrate from one side thereof.

Functions of this embodiment will be described next with reference to FIGS. 9A and 9B.

When a radiation impinges on the radiation detecting element 1, carriers (electrons and holes) are generated in the CdTe substrate 1a of the radiation detecting element 1 in an amount corresponding to the energy of incident photons. Pulsed charges are generated with movement of these carriers toward a bias electrode 1b formed on the radiation detecting element 1 or toward signal fetching electrodes 1c. These charge pulses are amplified and shaped by the signal processing circuit 2, and are thereafter counted by a pulse counting circuit not shown. Doses of radiation having entered the respective pixels of radiation detecting element 1 are known from the resulting counts.

The carriers generated in the CdTe substrate 1a remain in the CdTe crystals as trapped by defects or the like present in the crystals. This has heretofore been the cause of output reductions of the radiation detecting element 1 at a time of high dose incidence. In this embodiment, infrared rays are emitted from the infrared laser diode 7 into the CdTe substrate 1a when a radiation is detected, i.e. when the radiation detecting element 1 is in operation. This releases the carriers trapped in the defects or the like and allows the carriers to collect at the electrodes 1b or 1c quickly.

When the carriers generated in the crystals are trapped by the defects or the like, the carriers are captured by the deep level as shown in FIG. 9A. Since this level is deep, the carriers cannot be released at temperatures close to room temperature. However, when the infrared rays having an energy exceeding this trap level enter the substrate, the trapped carriers are excited by the light energy $h\nu$ (h is Planck's constant, and $\nu$ is frequency of infrared radiation). Then, as shown in FIG. 9B, the carriers return to the conduction band, move through the CdTe crystals, and collect at the electrodes.

As described above, the infrared rays emitted into the CdTe substrate 1a cause all the generated carriers to be collected by the electrodes. Consequently, a compensation is made for the output reductions of the radiation detecting element 1 occurring at a time of high dose incidence.

In an experiment, charge pulses were counted using the same radiation detecting element 1 for a case of emitting infrared rays into the CdTe substrate 1a and for a case of emitting no infrared rays. In the absence of infrared rays, output reductions were observed at a time of high dose incidence as shown in FIG. 10B. Where infrared rays were emitted, no output reduction was found in any region as shown in FIG. 10A. It has been confirmed that an effective compensation is made for the output reductions occurring in regions of high dose incidence.

In the above embodiment, the infrared laser diode 7 is used as a light source for emitting infrared rays. Instead, a different type of infrared emitting diode or infrared source may be employed.

The present invention may be embodied in other specific forms without departing from the spirit or essential attributes thereof and, accordingly, reference should be made to the appended claims, rather than to the foregoing specification, as indicating the scope of the invention.

What is claimed is:

1. A radiation detector for detecting radiation, comprising:
   a plurality of X-ray detecting elements formed of a compound semiconductor and including detecting elements which experience output reductions when the X-ray dose exceeds a predetermined level, and
   heating means for heating during radiation detection at least said X-ray detecting elements which experience said output reductions when said X-ray dose exceeds said predetermined level, said heating means exciting trapped carriers such that when said predetermined level is exceeded, compensation is provided for said output reductions.

2. A radiation detector as claimed in claim 1, wherein said radiation detecting elements are in an array and include a plurality of pixels.

3. A radiation detector for detecting radiation, comprising:
   a radiation detecting element formed of a compound semiconductor, and
   heating means for heating said radiation detecting element,
   wherein said heating means is formed of a sheet-like heater disposed on a substrate on which said radiation detecting element is mounted, said heater and said radiation detecting element being opposed to each other across said substrate.

4. A radiation detector for detecting radiation, comprising:
   a radiation detecting element formed of a compound semiconductor, and
   a light source means for emitting into said compound semiconductor during radiation detection infrared rays having an energy smaller than energy of a band gap of said compound semiconductor and greater than a trap level present in said compound semiconductor such that when the radiation dose exceeds a predetermined level, compensation is provided for a reduced radiation detection which occurs when said radiation dose exceeds said predetermined level.

5. A radiation detector as claimed in claim 4, wherein said light source is an infrared laser diode.

6. A radiation detector as claimed in claim 4, wherein said light source is an infrared light emitting diode.

* * * * *